Figure 1:
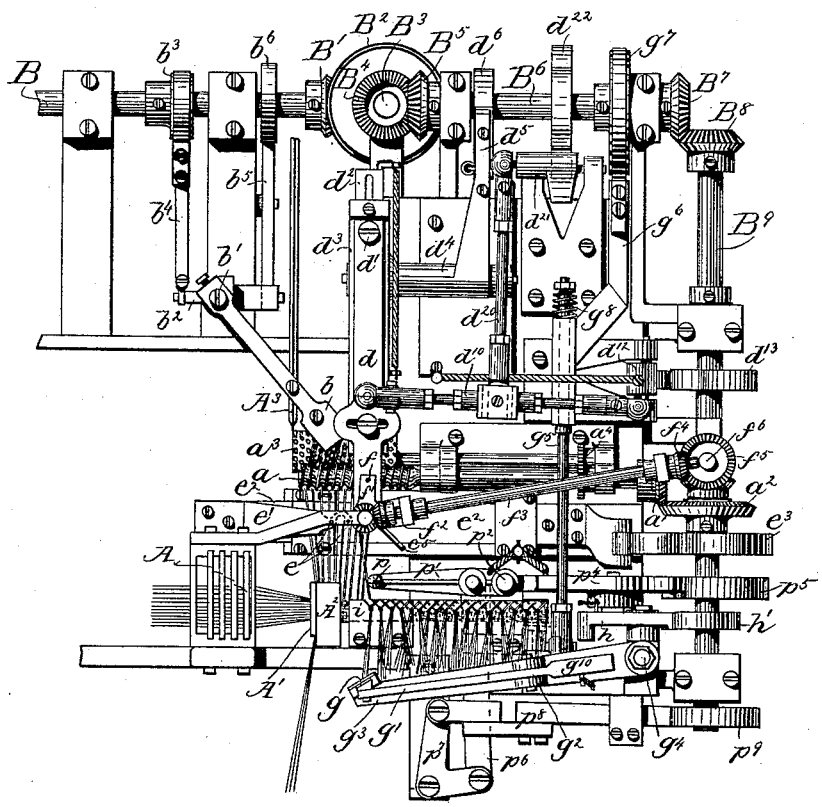

(No Model.) 7 Sheets—Sheet 1.

O. ARNOLD.
FRINGE MAKING MACHINE.

No. 451,423. Patented Apr. 28, 1891.

WITNESSES:
Jas. J. Maloney.
M. E. Hill.

INVENTOR
Oliver Arnold
BY
Jos. P. Livermore
ATTORNEY (No Model.)  7 Sheets—Sheet 2.
O. ARNOLD.
FRINGE MAKING MACHINE.
No. 451,423.  Patented Apr. 28, 1891.
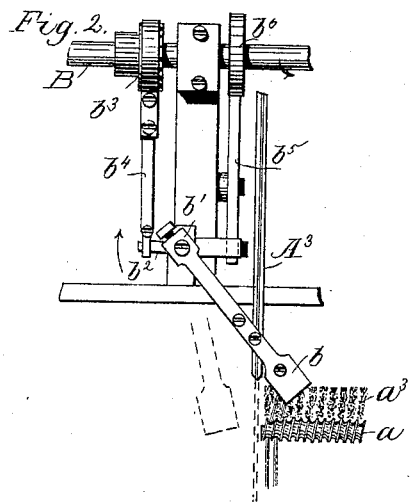
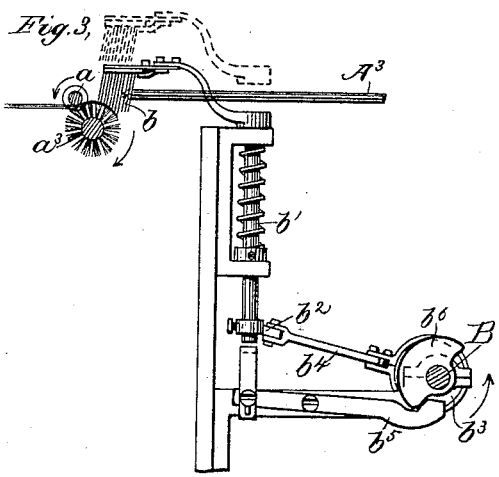
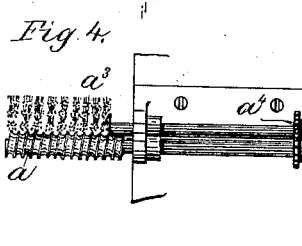
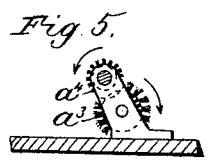
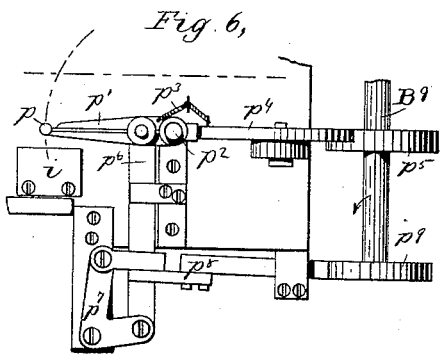
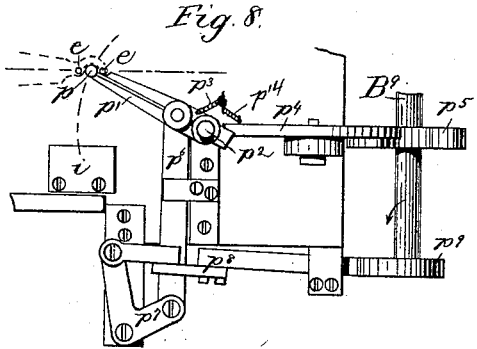
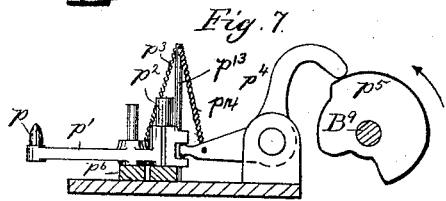
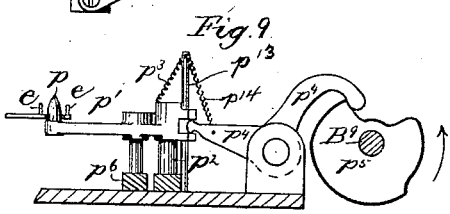
WITNESSES:
Jas. J. Maloney
M. E. Hill
INVENTOR
Oliver Arnold
BY Jos. P. Livermore
ATTORNEY (No Model.) 7 Sheets—Sheet 3.

O. ARNOLD.
FRINGE MAKING MACHINE.

No. 451,423. Patented Apr. 28, 1891.

WITNESSES:
Jas. J. Maloney.
M. E. Hill.

INVENTOR
Oliver Arnold
BY Jos. P. Livermore
ATTORNEY (No Model.) 7 Sheets—Sheet 4.

O. ARNOLD.
FRINGE MAKING MACHINE.

No. 451,423. Patented Apr. 28, 1891.

WITNESSES:
Jas. J. Maloney
M. E. Hill

INVENTOR
Oliver Arnold,
BY Jos. P. Livermore
ATTORNEY (No Model.)  7 Sheets—Sheet 5.
O. ARNOLD.
FRINGE MAKING MACHINE.
No. 451,423.  Patented Apr. 28, 1891.
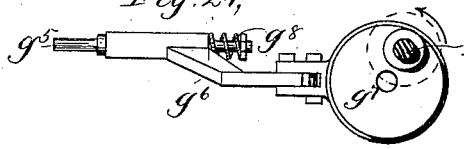
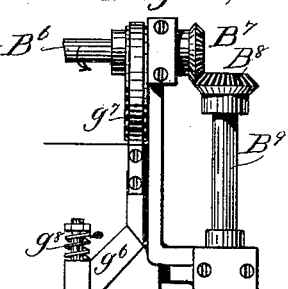
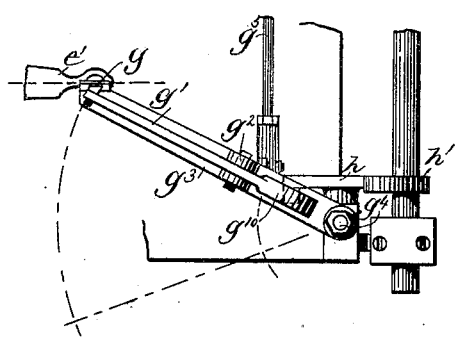
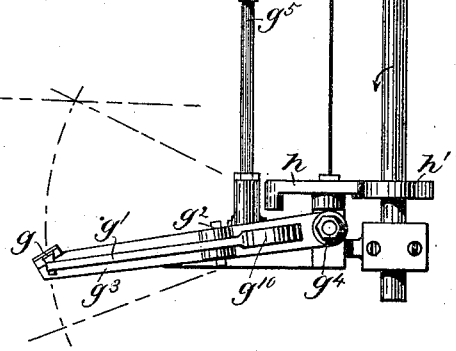
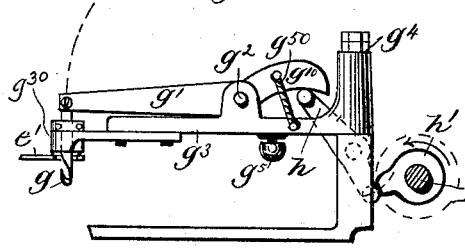
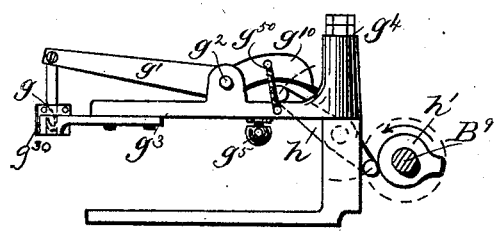
WITNESSES:
Jas. J. Maloney
M. E. Hill
INVENTOR
Oliver Arnold
BY Jos. P. Livermore
ATTORNEY (No Model.)  7 Sheets—Sheet 6.

O. ARNOLD.
FRINGE MAKING MACHINE.

No. 451,423. Patented Apr. 28, 1891.

WITNESSES:
Jas. J. Maloney.
M. E. Hill

INVENTOR
Oliver Arnold
BY Jos. P. Livermore
ATTORNEY (No Model.) 7 Sheets—Sheet 7.

O. ARNOLD.
FRINGE MAKING MACHINE.

No. 451,423. Patented Apr. 28, 1891.

WITNESSES:
Jas. M. Maloney
M. E. Hill

INVENTOR
Oliver Arnold
BY Jos. P. Livermore
ATTORNEY

UNITED STATES PATENT OFFICE.

OLIVER ARNOLD, OF WORCESTER, MASSACHUSETTS, ASSIGNOR TO EDWIN BROWN, TRUSTEE, OF SAME PLACE.

FRINGE-MAKING MACHINE.

SPECIFICATION forming part of Letters Patent No. 451,423, dated April 28, 1891.

Application filed December 22, 1886. Serial No. 222,327. (No model.)

*To all whom it may concern:*

Be it known that I, OLIVER ARNOLD, of Worcester, county of Worcester, State of Massachusetts, have invented an Improvement in Fringe-Making Machines, of which the following description, in connection with the accompanying drawings, is a specification, like letters on the drawings representing like parts.

My invention relates to a machine for tying knots that may be used for producing knotted fringe, such as is now commonly made by hand.

The knotting mechanism is herein shown as an attachment to a fringe-loom, it being actuated positively from the loom, with the various parts of the knotting mechanism timed to operate in conjunction with the loom, so that the fringe is knotted as it is woven; but it will be apparent that the knotting mechanism might be used independently of a loom to knot fringe at the end of a fabric that has been previously woven in an independent loom. The fringe is composed of warp-threads that form the head of the fringe, and weft or filling threads that are woven into the warp-threads in the usual manner, forming a selvage at one side thereof and extending beyond the warp-threads at the other side to form the fringe. Usually two or more filling-threads are employed, so that each pick of the fringe-loom makes a tuft of fringe-threads, and in knotting the fringe the separate tufts or picks are crossed near the head of the fringe, and one tuft is taken with the third one beyond and the two tied together with a simple overhand knot.

For convenience of description the end of the tuft or pick that is woven into the head of the fringe will be called the "fast end" and the other extremity will be called the "free end," and the tufts or bunches of threads passing through one shed of the warp-threads will be called a "pick," although it will be understood that the knotting might be made in a fringe composed of the warp-threads of an ordinary woven fabric—such as, for instance, the fringe that is used on toweling—so that the tufts or bunches of threads that are tied together need not necessarily stand in any definite relation to the parts or operations of the looms by which the fabric was woven.

The knotting mechanism consists, essentially, of a separator and stretcher by which the different picks or bunches of thread are kept separate and apart from one another and stretched across from the head of the fringe to the separating device, somewhat like the strings of a musical instrument, although the tension is slight, being merely enough to keep the threads straight. The separate taut picks are then acted upon by a looping device, which takes up one pick and then passes over an intervening pick and takes up the next pick that is to be tied together with the one first picked up. This looping device then carries the tufts or bunch of threads consisting of two picks around a pair of loop-holding fingers or pins and across the taut part of the thread, so as to form a triangular loop, and then carries the free end of the tuft across below the loop and holds it there, while another device, herein called the "knot-drawer," passes down through the loop and picks up the free end of the thread, taking it from the looper and drawing it through the loop, so that the knot is formed, but not yet drawn up tight. The knot-drawer then moves away with the free end to draw up the loop, which is at this time taken off from the fingers and held by a device called the "knot-placer," which follows the knot-drawer toward the head of the fringe, running the loop up from the free end toward the fast end of the tuft in proportion as the loop tightens, the operation being so timed that the knot is drawn tight and removed from the knot-placer when it arrives at the proper distance from the head of the fringe.

The invention lies, broadly, in the means for tying knots in the proper position in the fringe-threads of a fringe fabric; and it consists, mainly, in the construction and arrangements of the devices described, or their substantial equivalents, in conjunction with actuating mechanism by which they are given the proper movement with relation to one another at the proper times and with some auxiliary devices not yet mentioned; but it is obvious that the invention is not limited to the exact construction of the devices shown, nor to that of the mechanism chosen to actuate them, as the construction of the devices and their operating mechanism can be widely varied by the exercise of mechanical knowledge and skill without departing from the main features of the invention or materially changing the construction and essential mode of operation of the devices, which are believed to be the first to produce a knot of the kind herein shown and described in fringe, this work being now done by hand exclusively.

Figure 10:
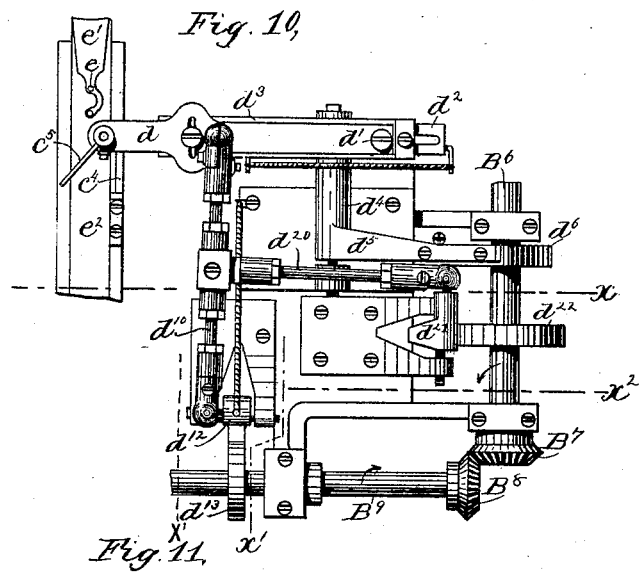
Figure 14:
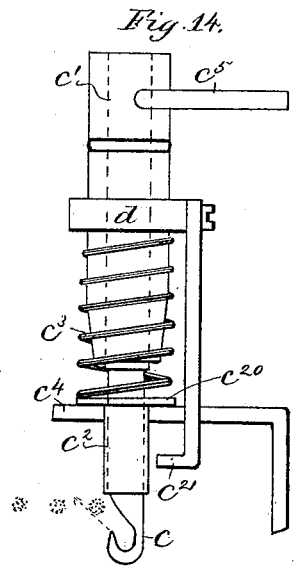
Figure 11:
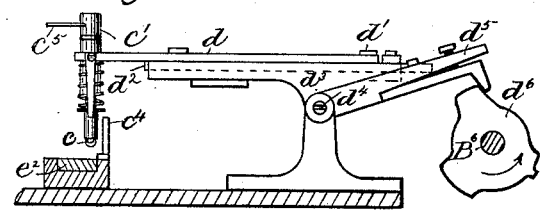
Figure 15:
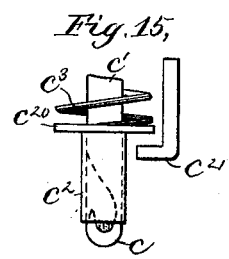
Figure 12:
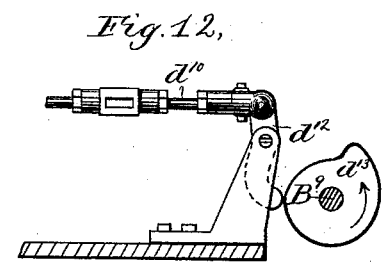
Figure 13:
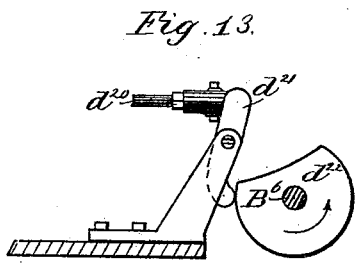
Figure 16:
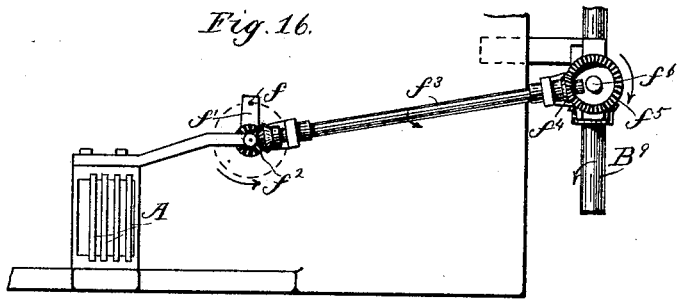
Figure 17:
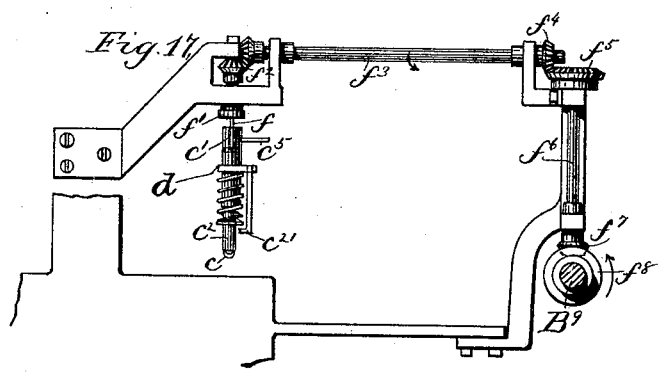
Figure 18:
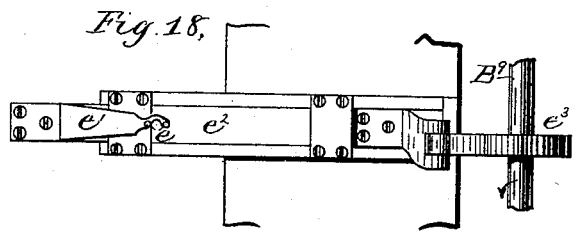
Figure 19:
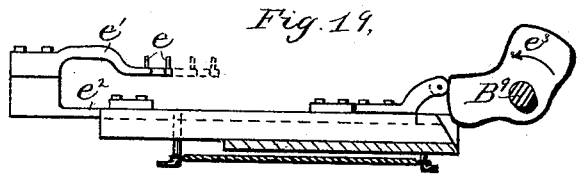
Figure 25:
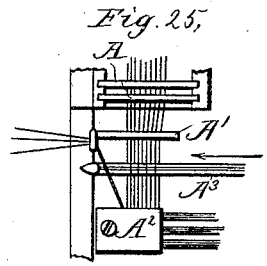

Figure 1 is a plan view of an apparatus for knotting fringe produced by a fringe-loom, a sufficient portion of which loom is represented to show the relation of the knotting mechanism to the main operative parts of the loom. Figs. 2 and 3 are respectively a plan view and a side elevation of the devices for carrying the picks of filling-thread to the separator; Figs. 4 and 5, a plan view and a sectional detail of the thread separator and tightener and their actuating mechanism; Figs. 6 and 7, a plan view and a sectional elevation of the knot-placing device and its actuating mechanism in the position occupied just after the knot is drawn off from it; Figs. 8 and 9, similar views of these parts in the position in which the knot-placer takes the loop from the knot-holding fingers. Fig. 10 is a plan view, and Fig. 11 a sectional elevation on the line $x$ of Fig. 10, of the looper and actuating mechanism that produces its up-and-down movement; Fig. 12, a sectional elevation, on line $x'$ of Fig. 10, of the actuating parts that give the looper its lateral movement in one direction; Fig. 13, a sectional elevation, on line $x^2$ of Fig. 10, of the mechanism that gives the looper its lateral movement in the other direction; Fig. 14, an enlarged detail of the looper with the hook open; Fig. 15, a similar detail with the hook closed and the thread clamped therein; Figs. 16 and 17, a plan view and a side elevation of the mechanism for imparting rotary movement to the looper-hook; Figs. 18 and 19, a plan view and a side elevation of the loop-holding fingers and their actuating mechanism; Figs. 20 and 21, a plan view and a side elevation of the knot-drawing device and mechanism that operates it to draw the end of the thread through the loop to form the knot; Fig. 22, an elevation similar to Fig. 21, but with the parts in different position; Figs. 23 and 24, a plan view and a side elevation of the mechanism for operating the knot-drawer to draw up and tighten the knot; and Figs. 25 to 41 details representing the various positions and relative movements of the devices by which the knot is formed, showing the same independently of the actuating mechanism.

For convenience the part toward the bottom of the sheet in Fig. 1 will be spoken of as the "front" of the machine, and the part toward the top of the sheet as the rear of the machine in describing the relative positions and movements of the various parts.

The invention is shown as employed in connection with a loom having the usual harness-frames A, lay A', temple or clamp $A^2$, and a hook or needle $A^3$, by which the weft-thread or filling is drawn in successive picks through the open shed in the warp-threads and some distance beyond and is then preferably cut off in the hook of the needle after being beaten up by the lay. These parts of the loom may all be of suitable or usual construction and actuated at the proper times by mechanism of any suitable construction driven by a main revolving shaft which turns once at each pick or to-and-fro movement of the hook $A^3$.

A shaft B, actuated from and driven at the same speed as the shaft of the loom, is connected by beveled gearing $B'$ $B^2$ with a vertical shaft $B^3$, connected by equal beveled gears $B^4$ $B^5$ with a shaft $B^6$, connected by equal beveled gears $B^7$ $B^8$ with a shaft $B^9$ at right angles to the shaft $B^6$ or transverse to the machine.

As two picks of the loom are tied together in a single knot, it will be understood that the knotting mechanism goes through one cycle of operations in the time of two operations or picks of the loom, and the main actuating-shafts $B^6$ and $B^9$ for the knotting mechanism are driven at one-half the speed of the shaft B and main shaft of the loom by the beveled gears $B'$ $B^2$, the latter of which has double the number of teeth that the former has, while all the other beveled gears connecting the shafts $B^3$ $B^6$ $B^9$ are equal.

The different picks, as they are drawn through the shed by the hook $A^3$, are taken and held separate from one another and drawn sufficiently from the head of the fringe by the separating and tightening devices, which are shown in detail in Figs. 2, 3, 4, 5, and 26.

The separator $a$ consists, essentially, of a shaft having a deep thread or spiral groove cut around it, in the consecutive turns of which the different picks lie, the said shaft being rotated once at each revolution of the main shaft of the loom by gears $a'$ $a^2$ from the shaft $B^9$, the said gear $a^2$ having double the number of teeth that the gear $a'$ has, so that the separator revolves once at each pick.

Figure 26:
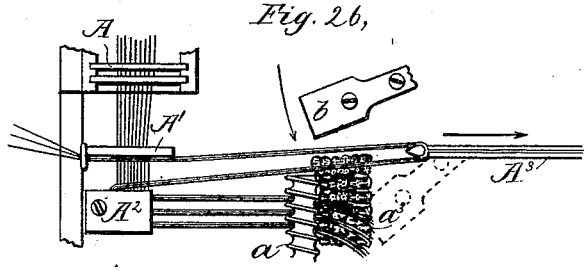

The different picks are held in the spiral groove of the separator $a$ by a brush $a^3$, that constitutes the thread-tightener, and is driven from the shaft of the separator $a$ by gears $a^4$, (see Figs. 4 and 5,) the said brush tending to draw the threads out straight from the head of the fringe, as shown in Fig. 26, and holding the bunch of threads forming each pick separated from the adjacent picks a slight distance, as represented in Figs. 1 and 26 to 28. The threads of each pick immediately after they have been drawn through the shed by the hook $A^3$ are carried into the separator by a vibrating brush $b$, (see Figs. 2 and 3,) mounted on a rock-shaft $b'$, provided with an arm $b^2$, operated by a rod $b^4$ and an eccentric $b^3$ on the shaft B, thus vibrating the brush $b$ back and forth across the path of the needle. The said rock-shaft $b'$ and brush $b$ are raised as the latter is moved back from the separator and lowered as it moves forward by a lever $b^5$, operated by a cam $b^6$ on the main shaft B.

The fringe is fed forward as fast as it is woven by the usual feeding mechanism, with about a dozen of the picks stretched across from the head of the fringe to the separator $a$ and brush $a^3$, as shown, and the pitch of the thread of the separator $a$ may be somewhat greater than the distance between adjacent picks at the head of the fringe, so as to spread the picks a little farther apart at the free end than at the fast end, as shown in Fig. 1. The foremost pick on arriving at the knotting mechanism is engaged by the looper $c$, the construction of which is best shown in Figs. 14 and 15, the same consisting of a hook in the end of a shaft $c'$, that has a universal movement, in order to gather in the proper threads and place them in the proper position to be acted upon by the other devices. The said looper-hook is provided with a hook-coverer consisting of a sleeve $c^2$, free to slide on the shaft $c'$ above the hook, and provided with a flange $c^{20}$, by which it may be raised with relation to the hook, the said coverer being normally pressed down by a spring $c^3$, so that it bears on the thread in the hook, as shown in Fig. 15, and thus, with the hook, constitutes a clamp that takes hold of the thread with sufficient firmness to control it in the subsequent operations.

Figure 27:
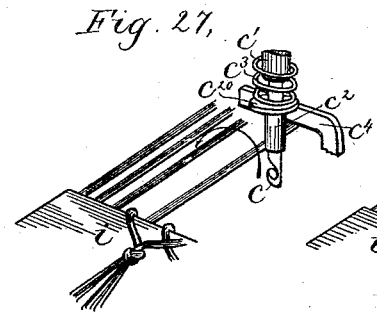
Figure 28:
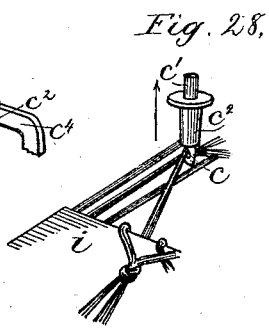
Figure 29:
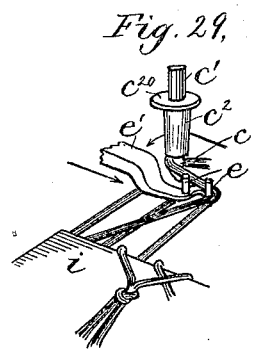
Figure 30:
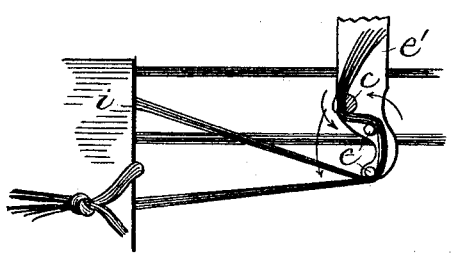
Figure 31:
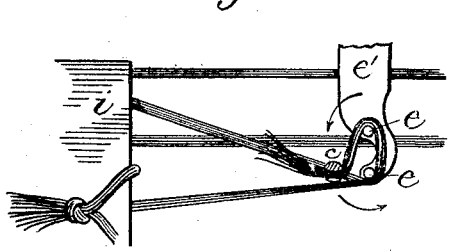
Figure 32:
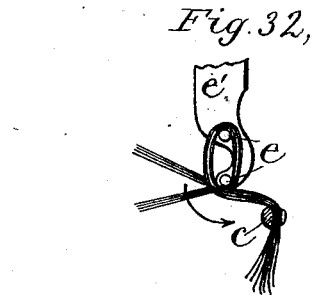
Figure 33:
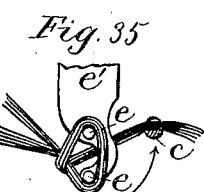
Figure 34:
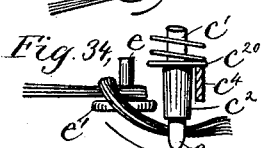
Figure 35:
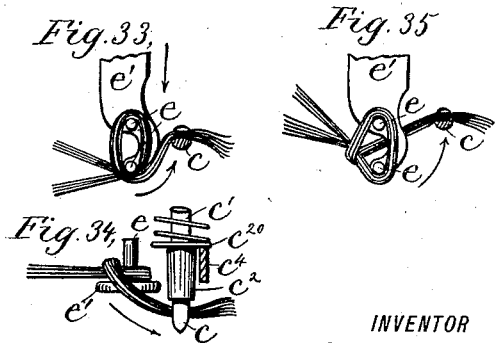
Figure 36:
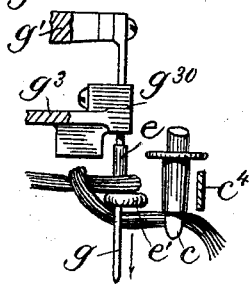
Figure 37:
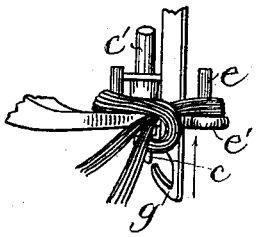
Figure 38:
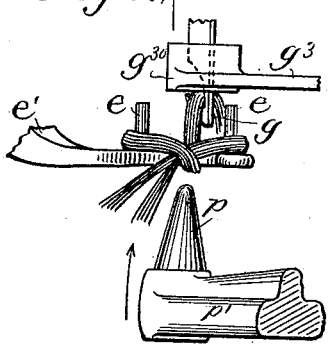
Figure 39:
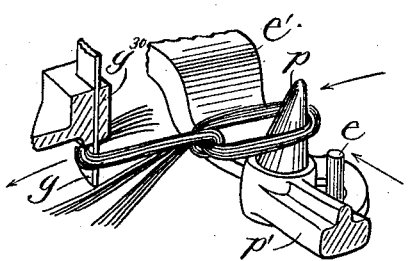

The movements of the looper-hook in the different directions at the proper times are effected by the following means, (best shown in Figs. 10 to 13:) The shaft $c'$ of the said looper is supported in bearings at the end of an arm $d$, pivoted at $d'$ on a slide $d^2$, capable of moving longitudinally in a suitable guide on a supporting-lever $d^3$, pivoted at $d^4$ and provided with an arm $d^5$, engaged by a cam $d^6$ on the shaft $B^6$, which rocks the lever $d^3 d^5$, and thus produces the up-and-down movement of the looper, as will be readily understood from Fig. 11. The right-and-left movement of the looper that is parallel with the warp-thread of the fringe is produced by moving the arm $d$ about its pivot $d'$ by means of a link $d^{10}$, connected with a lever $d^{12}$, operated by a cam $d^{13}$ on the shaft $B^9$, (see Fig. 12,) the said link $d^{10}$ having its end connections made by ball-and-socket joints to admit of the universal movement required. The forward-and-back movement of the looper toward and from the warp-threads is produced by moving the slide $d^2$ longitudinally in its guide on the lever $d^3$ by means of a link $d^{20}$, connected with the link $d^{10}$, and also with a lever $d^{21}$, actuated by a cam $d^{22}$ on the shaft $B^6$, (see Fig. 13,) and it will be seen that by a proper shaping of the cams $d^6$, $d^{13}$, and $d^{22}$ a combined movement may be given to the looper, causing it to travel in any desired direction in space. The first movements of the looper are as represented in Figs. 27 and 28, it being at this time in its most remote position from the head of the fringe or nearest the free ends of the fringe-threads. The looper $c$ is thus depressed by the cam $d^6$, while the hook-coverer $c^2$ is prevented from moving downward by a stationary finger $c^4$, forming a hook-opener, so that the hook is then uncovered and is at this time moved laterally by the cam $d^{13}$ toward the left in Fig. 1, taking in the threads of the foremost pick. The looper rises at this time while still moving to the left, so that the hook-coverer closes on the thread of the pick, which is lifted and carried to the second pick in the rear, passing over one pick, as shown in Figs. 27 and 28. The adjacent pick to the one first taken by the looper has already been tied to one in advance. The hook is then depressed again by the cam $d^6$ in front of the second pick from the one first taken, and the hook again is uncovered by the action of the hook-opener $c^4$, when by a slight further movement to the left and upward it gathers in, and the hook-coverer closes upon this second pick, and the two picks thus clamped in are raised to a higher level than those that are under the separator. The looper then begins the forward movement by which the two picks now forming a single tuft or bunch of thread are carried around two loop-holding fingers $e$, supported on an arm $e'$, connected with a slide $e^2$, having a reciprocating movement parallel with the warp-threads, produced by a cam $e^3$ on the shaft $B^9$. These parts are best shown in Figs. 18 and 19. This slide-bar $e^2$ is below the thread, and the arm $e'$ rises up at the rear of the hook $A^3$ and extends forward above the threads, and the lateral movement of the fingers $e$ co-operates with the lateral and forward movement of the looper-hook $c$ to carry the free end of the tuft around the said fingers and across the part of the thread that extends from the head of the fringe to the fingers $e$, as shown in Figs. 29 to 34, inclusive, thus forming a triangular-shaped loop, as shown in Fig. 35. The looper is then depressed below the level of the loop-holding fingers $e$, as shown in Fig. 36, but is sufficiently far above the hook-opener $c^4$ not to raise the hook-coverer and relieve the hold on the thread, which is thus drawn across the middle of the loop and below the same, as shown in Figs. 35 and 36. The next operation in making the knot is to draw the free end of the thread up through the loop while the latter is held open on the fingers $e$, as shown in Figs. 35 and 36, and this operation is performed by the knot-drawer, that also consists of a hook which passes down through the loop between the fingers $e$, after which the looper $c$ makes a slight lateral movement that places the thread in the hook of the knot-drawer, which then moves up, drawing the thread lengthwise out through the hook $c$ and up through the loop on the fingers $e$ and clamps the thread in the hook $g$ against the socket in which the said hook has its lengthwise movement, as shown in Fig. 38. A finger $c^{21}$, Figs. 14 and 15, prevents the hook-coverer $c^2$ from dropping off the hook when there is no thread in the latter.

Figure 40:
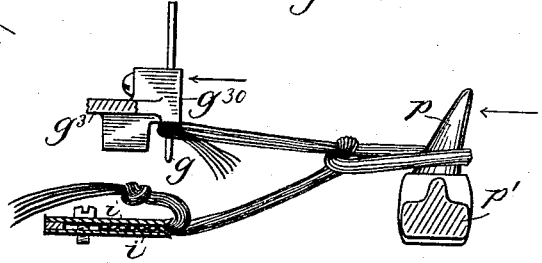
Figure 41:

Before describing the actuating mechanism of the knot-drawer there is one more feature in the operation of the looper $c$ to be described, which is as follows: When the looper moves around the fingers $e$ to form the loop thereon, it is desirable to rotate the looper-hook about its axis, in order to prevent winding the thread around the shank of the hook, as would take place if it were not so rotated. To effect this the shaft $c'$ of the looper-hook is free to turn with moderate friction in its bearings in the lever $d$, and is provided with an arm $c^5$, which, when the lever is in its elevated position, is engaged by a projection $f$ on an arm $f'$ on a shaft (see Figs. 16 and 17) operated by beveled gearing $f^2$ from a shaft $f^3$, operated by beveled gearing $f^4 f^5$ from a shaft $f^6$, operated by beveled gearing $f^7 f^8$ from the shaft $B^9$. This gearing is so proportioned as to produce four rotations of the arm $f$ during one rotation of the shaft $B^9$, as the movement of the looper $c$ about the pins occupies about one-fourth of the whole time of making a knot, and the arm $c^5$ of the looper is engaged by the arm $f$ only when the looper is in its highest position or above the fingers $e$. From this it results that the looper is rotated once around during its movements around the pins $e$, (represented in Figs. 29 to 35,) and is then disengaged from the arm $f$, when the hook is in proper position to take up the threads for the next knot, as shown in Fig. 27. The knot-drawing hook $g$ (see Figs. 20 to 24) is connected with an actuating-lever $g'$, pivoted at $g^2$ on a supporting and guiding lever $g^3$, that has a vibratory movement on a pivot $g^4$, said lever being actuated by a link or pitman $g^5 g^6$ from an eccentric $g^7$ on the shaft $B^6$. The pitman $g^5 g^6$ is connected by a ball-and-socket joint with the lever $g^3$, and is made in two portions, one longitudinally movable in the other, and acted upon by a spring $g^8$, which permits the lever $g^3$ to be arrested positively by the fingers $e$ in its backward movement when the hook is exactly over the open loop, and also permits the lever to dwell a sufficient time in this position, and at this time the end $g^{10}$ of the arm $g'$ comes, as shown in Figs. 20 and 21, over a lever $h$, operated by a cam $h'$ on the shaft $B^9$, which raises the arm $g^{10}$ and carries the hook $g$ down through the loop to receive the free end of the thread from the looper, as before described. The hook $g$ works longitudinally in a socket $g^{30}$ in the end of the lever $g^3$, and, when permitted by the arm $h$, is raised by a spring $g^{50}$, that draws the hook $g$ up, so as to clamp the bunch of threads firmly between the hook and its socket $g^{30}$, as represented in Figs. 38 to 41. The lever $g^3$ is then vibrated by the action of the eccentric $g^7$ from its position over the loop toward the front of the machine, thus tending to draw up the knot. It is necessary, however, that the knot which is thus formed near the free end of the thread should be drawn up tight near the head of the fringe, which, opposite the knotting mechanism, passes between a pair of plates $i$, as best shown in Figs 40 and 41. The proper position of the knot as it is drawn up is insured by the action of the knot-placer, consisting of a tapering finger $p$, formed at the end of a lever $p'$, (see Figs. 6 to 9,) fulcrumed on a rod $p^2$, on which the said lever can slide up and down, it being normally impelled upward by a spring $p^3$, but engaged by a lever $p^4$, actuated by a cam $p^5$ on the shaft $B^9$, which cam thus controls the upward-and-downward movement of the knot-placing finger $p$, which is carried up through the loop, lifting the same off the fingers or pins $e$, as shown in Figs. 8, 9, 38, and 39, just after the hook $g$ has drawn the free end of the thread through the loop. The spring $p^3$ is connected with an upright or post $p^{13}$ from the base-plate of the machine, as shown in Figs. 7 and 9, and the lever $p^4$ is held against its cam $p^5$ by a spring $p^{14}$, connected with said post. The knot-placer then follows the knot-drawer as the latter draws the free end of the thread toward and over the free head of the fringe, the knot gradually tightening over the finger and the loop traveling along from the free toward the fast end of the thread until just at the proper time the knot is drawn tight, and at the same moment the placer $p$ moves downward out of it, as represented in Figs. 7 and 41. The lateral movement forward and back of the placer $p$ is produced by a link $p^6$, which engages the lever $p'$ by a long pin, as shown, so as to accommodate the upward-and-downward movement of the said lever, and the said link $p^6$ is connected by a lever $p^7$ with a slide $p^8$, actuated by a cam $p^9$ on the shaft $B^9$.

It may be stated, generally, that all the parts are held up to their actuating-cams by springs which do not need to be more specifically described in order to give an understanding of the machine.

I am well aware that it is a simple matter to vary widely the construction of the different devices herein described for separating the fringe-threads and forming a knot therein, and that the actuating mechanism by which the movements of these devices in cooperating with one another are properly timed is also capable of wide variation, without, however, departing from the general mode of operation of the devices herein described for making the knot, and for this reason the invention is not limited to the specific construction of the devices and their actuating mechanism adopted in this instance for carrying out the invention.

I claim—

1. The combination, in a machine for tying knots in fringe, of the guides for the head of the fringe and devices for separating the loose ends of the fringe while the head is held in the guides, with knotting mechanism for tying knots in the loose ends of the fringe after they are separated, substantially as set forth.

2. The combination, in a machine for weaving and tying knots in fringe, of mechanism for weaving the heading of a fringe, with devices for separating the loose ends of the filling threads, and knotting devices so arranged as to tie knots in said filling-threads after the weaving mechanism has finished the weaving of the heading, substantially as set forth.

3. The combination of mechanism for weaving the heading of a fringe, comprising the heddles, the reed, and the weft-needle having a long stroke, with a separating device arranged in such a position with respect to said needle as to carry the weft away from the line of the needle at each pick, substantially as described.

4. The combination, in a machine for weaving and tying knots in a fringe, of mechanism for weaving the heading and weft-separating devices for keeping tension on the loose ends of the weft after the heading is woven, with a knot-tying device for knotting the separated ends of the weft and so arranged in respect to the heading as to tie the knots in the loose ends of the wefts near their ends and to draw the formed knots near to the heading, substantially as and for the purpose described.

5. The combination of a looper adapted to loop one or more strands of threads with fingers around which said strands are passed, mechanism for moving said looper in the path described, a hook, and means for operating the same to pull the free end of the strand through the loop formed over the pins, substantially as set forth.

6. The combination, with a looping device and a pivoted arm connected therewith, of a longitudinally-movable slide connected with said arm, and a supporting-lever on which said slide moves, and actuating-cams and connections between said cams and the supporting-lever and the pivoted arm, whereby the looping devices connected with the said arm have a universal movement, substantially as and for the purpose described.

7. The combination of the holding-fingers and the looping device for forming a loop of thread thereon with the knot-drawer that pulls the free end of the thread through the loop and the knot-placer that takes the loop from the supporting-fingers and holds it while being drawn through by the knot-drawer, all operating substantially as described.

8. The combination of the rotating separator having a spiral groove with a rotating brush by which the threads are drawn tight in the successive convolutions of said groove, substantially as described.

9. The combination of the looping device consisting of a thread-holding clamp and actuating mechanism, substantially as described, by which it is moved in all directions in space, with a turning device, substantially as described, for said clamp, whereby it is rotated, while having a substantially revolving movement for the purpose of forming the thread into a loop without winding the thread about the said clamp, substantially as described.

10. The combination of a separator and stretcher by which the fringe-threads of a fringed fabric are retained in separate taut bunches or tufts with a looping device composed of a hook, and a hook-coverer consisting of a thread-holding clamp, the said looper device having a universal movement in space, and actuating mechanism, substantially as described, for said looping device for moving the same relative to the stretched bunches of fringed threads, as set forth, whereby two of said bunches are taken by the said looper and together formed into a loop, substantially as set forth.

11. The combination of a weft-drawing hook of a fringe-loom with a separator for holding the different picks of filling-thread separate, and a vibrating brush that carries the pick of thread into the separator after being drawn through the shed by the said hook, substantially as described.

12. The combination, with loop-forming devices, of the knot-drawer composed of a hook and actuating-lever and actuating devices therefor, by which the said hook is moved in the direction of its shank, and a supporting-lever in which the shank of said hook moves, and actuating mechanism for vibrating said supporting-lever, by which the hook is moved in a direction transverse to its shank, substantially as described.

13. The combination, in a machine for knotting the free ends of weft-threads of a fringe, the same consisting of a retaining device for the heading of the fringe, a separating device for the free ends of said fringe, and a looper adapted to engage with one of the separated strands and move over to engage with another strand, of pins around which the said looper carries the strands, forming a partial knot, a hook adapted to pass through the loop formed by said looper and pins and draw the knot thus formed, and operating mechanism for the looper and hook, substantially as shown and described.

In testimony whereof I have signed my name to this specification in the presence of two subscribing witnesses.

OLIVER ARNOLD.

Witnesses:
EDWIN BROWN,
HENRY E. HILL.